(12) United States Patent  
Ukita (10) Patent No.: US 8,405,744 B2
(45) Date of Patent: Mar. 26, 2013

(54) IMAGE-CAPTURING APPARATUS, IMAGE-CAPTURING METHOD, AND PROGRAM

(75) Inventor: Shinji Ukita, Hyogo (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 12/432,900

(22) Filed: Apr. 30, 2009

(65) Prior Publication Data

US 2009/0290049 A1    Nov. 26, 2009

(30) Foreign Application Priority Data

May 26, 2008    (JP) ................ 2008-136915

(51) Int. Cl.
*H04N 5/217*    (2011.01)
*H04N 9/64*    (2006.01)
(52) U.S. Cl. ........................ 348/241; 348/243
(58) Field of Classification Search ............ 348/241, 348/243
See application file for complete search history.

(56) References Cited

U.S. PATENT DOCUMENTS

| | | | | |
|---|---|---|---|---|
| 6,982,705 | B2* | 1/2006 | Kunimi et al. ............... | 348/294 |
| 2008/0218609 | A1* | 9/2008 | Blanquart et al. ............ | 348/243 |

FOREIGN PATENT DOCUMENTS

| | | |
|---|---|---|
| JP | 11-136580 | 5/1999 |
| JP | 2004-88306 | 3/2004 |
| JP | 2004-336244 | 11/2004 |
| JP | 2005-130331 | 5/2005 |
| JP | 2005-312805 | 11/2005 |
| JP | 2006-33036 | 2/2006 |
| JP | 2007-6538 | 1/2007 |
| JP | 2009-171493 | 7/2009 |

* cited by examiner

*Primary Examiner* — Alicia M Harrington (74) *Attorney, Agent, or Firm* — Oblon, Spivak, McClelland, Maier & Neustadt, L.L.P.

(57) ABSTRACT

An image capturing apparatus includes an image-capturing device having an effective pixel area formed of a plurality of areas, the areas having different dark current characteristics. The image-capturing device also includes a light-shielded pixel area, a storage unit configured to prestore a correlation between dark current differences of the plurality of areas and dark current of the light-shielded pixel area, a detector, a dark current difference obtaining unit, and a correction processor. The dark current differences are obtained from the dark current of the light-shielded pixel area detected during image capture on the basis of the stored correlation, and a video signal captured in the effective pixel area is corrected based on the obtained dark current differences.

8 Claims, 4 Drawing Sheets

IMAGE-CAPTURING APPARATUS, IMAGE-CAPTURING METHOD, AND PROGRAM

BACKGROUND OF THE INVENTION

1. Field of the Invention

The present invention relates to an image-capturing apparatus, an image-capturing method, and a program.

2. Description of the Related Art

Image-capturing apparatuses, such as digital cameras, which have been widely used in recent years, include image-capturing devices, such as CMOSs or CCDs, and a light signal is converted into an electrical signal using the image-capturing devices, thereby generating a captured image. Such an image-capturing device is configured to have an effective pixel area for obtaining image data and an optical black (OB) area that does not receive light due to provision of a light-shielding structure, which is arranged in the region surrounding the effective pixel area. As an example of a process for removing dark current, some image-capturing devices measure the dark current of an OB area so as to estimate the dark current of an effective image area, and remove the dark current on the basis of the measured value.

For example, in Japanese Unexamined Patent Application Publication No. 2005-312805 described below, it is described that the ratio of dark current in an OB area in a predetermined exposure time period to the dark current of a specific portion of an effective pixel part is stored in advance, the dark current of the effective pixel part is calculated on the basis of the dark current measured in the OB area during image capturing and the stored ratio, and the calculated dark current of the effective pixel part is removed from an output signal.

SUMMARY OF THE INVENTION

In recent years, in order to further improve the quality of a captured image, an image-capturing apparatus including a large image-capturing device in which the number of effective pixels is increased so as to be capable of capturing a high-quality image has been developed. For example, an image-capturing apparatus including a large CMOS image-capturing device of the same size as a 35 mm film (36 mm×24 mm) has appeared.

An image-capturing device, such as a CMOS or a CCD, is formed by a semiconductor, and is manufactured in such a manner that an integrated circuit is formed on a silicon substrate by a semiconductor manufacturing process including an exposure process. More specifically, a process for reducing the mask pattern of a semiconductor integrated circuit and printing it on a silicon substrate is performed using a stepper. However, there is a limit to the range in which exposure is possible using a stepper. In a case where a large image-capturing device having the same size described above as a 35 mm film (36 mm×24 mm) is to be manufactured, processes for dividing an image-capturing device into a plurality of areas, performing an exposure process in units of each divided area, and completing an integrated circuit of the entire image-capturing device are performed by performing an exposure process a plurality of times.

However, in an image-capturing device manufactured by performing such an exposure process a plurality of times, a boundary occurs in an area that is divided and exposed, and exposure is performed at a timing different for each divided area, presenting the problem that characteristics differ for each area. For this reason, sensitivity difference and a dark current difference occur for each divided area serving as a divided exposure unit by a semiconductor manufacturing apparatus, and thus, areas of different image quality occur on one image area of a captured image. In particular, regarding dark current, a slight step difference (dark current step difference) which occurs on both sides of a joint increases depending on image-capturing conditions, such as the exposure time period, the temperature, and the gain.

The technique described in Japanese Unexamined Patent Application Publication No. 2005-312805 does not assume a difference in a video signal and a dark current step difference, which occur due to division exposure. For this reason, a video signal obtained for each divided area differs. As a result, a problem arises in that a decrease in image quality occurs.

It is desirable to provide a novel and improved image-capturing apparatus capable of reliably suppressing a difference in image quality for each divided area in a case where an image-capturing device is manufactured by division exposure, an image-capturing method for use therewith, and a program for use therewith.

According to an embodiment of the present invention, there is provided an image-capturing apparatus including: an image-capturing device having an effective pixel area formed of a plurality of areas having different dark current characteristics and a light-shielded pixel area arranged in the region surrounding the effective pixel area; a storage unit configured to prestore a correlation between dark current differences in the plurality of areas and dark current of the light-shielded pixel area; a detector configured to detect the dark current of the light-shielded pixel area during image capturing; a dark current difference obtaining unit configured to obtain, from the dark current of the light-shielded pixel area, the dark current being detected during the image capturing, dark current differences of the plurality of areas during image capturing on the basis of the correlation stored in the storage unit; and a correction processor configured to correct a video signal obtained from the effective pixel area on the basis of the dark current differences among plurality of areas during the image capturing. With such a configuration, a correlation between dark current differences in a plurality of areas and dark current of the light-shielded pixel area is prestored in the storage unit. On the basis of this correlation, dark current differences of the plurality of areas during image capturing are calculated from the dark current of the light-shielded pixel area, the dark current being detected during image capturing. Since a video signal obtained from the effective pixel area is corrected on the basis of the dark current differences during the image capturing, it is possible to reduce a decrease in image quality, which results from the differences in the dark current characteristics even when the effective pixel area is formed of a plurality of areas having different dark current characteristics.

The storage unit may store, as the correlation, a table in which dark current differences of the plurality of areas and the dark current of the light-shielded pixel area are associated with one another so as to be obtained under a plurality of different conditions.

The storage unit may store, as the correlation, ratios of the dark current differences among the plurality of areas to the dark current of the light-shielded pixel area.

The plurality of areas having different dark current characteristics may be separated by a boundary line, and the dark current of the light-shielded pixel area may be obtained within the light-shielded pixel area.

According to another embodiment of the present invention, there is provided an image-capturing method including the steps of: prestoring a correlation between dark current differences among a plurality of areas and dark current of a light-shielded pixel area in an image-capturing device having an effective pixel area formed of the plurality of areas having different dark current characteristics and a light-shielded pixel area arranged in the region surrounding the effective pixel area; detecting the dark current of the light-shielded pixel area during image capturing; obtaining, from the dark current of the light-shielded pixel area, the dark current being detected during the image capturing, dark current differences of the plurality of areas during image capturing on the basis of the correlation; and correcting a video signal obtained from the effective pixel area on the basis of the dark current differences among plurality of areas during the image capturing. With such a configuration, a correlation between dark current differences in the plurality of areas and dark current of the light-shielded pixel area is prestored. On the basis of this correlation, dark current differences of the plurality of areas during image capturing are calculated from the dark current of the light-shielded pixel area, the dark current being detected during the image capturing. Since a video signal obtained from the effective pixel area is corrected on the basis of the dark current differences during the image capturing, it is possible to reduce a decrease in image quality, which results from the differences in the dark current characteristics even when the effective pixel area is formed of a plurality of areas having different dark current characteristics.

According to another embodiment of the present invention, there is provided a program for causing a computer to function as means for detecting dark current of a light-shielded pixel area of an image-capturing device during image capturing; means for obtaining, from the dark current of the light-shielded pixel area, the dark current being detected during the image capturing, dark current differences of the plurality of areas during image capturing on the basis of a pre-obtained correlation between dark current differences of a plurality of areas having different dark current characteristics in an effective pixel area and dark current of the light-shielded pixel area; and means for correcting a video signal obtained from the effective pixel area on the basis of the dark current differences of the plurality of areas during the image capturing. With such a configuration, a correlation between dark current differences in the plurality of areas and dark current of the light-shielded pixel area is prestored. On the basis of this correlation, dark current differences of the plurality of areas during image capturing are calculated from the dark current of the light-shielded pixel area, the dark current being detected during the image capturing. Since a video signal obtained from the effective pixel area is corrected on the basis of the dark current differences during the image capturing, it is possible to reduce a decrease in image quality, which results from the differences in the dark current characteristics even when the effective pixel area is formed of a plurality of areas having different dark current characteristics.

According to embodiments of the present invention, it is possible to reliably suppress a difference in image quality for each divided area in a case where an image-capturing device is manufactured by division exposure.

DESCRIPTION OF THE PREFERRED EMBODIMENTS

Preferred embodiments of the present invention will be described in detail below with reference to the attached drawings. In this specification and the drawings, components having substantially the same functions are designated with the same reference numerals, and accordingly, duplicated descriptions thereof are omitted.

Figure 1:
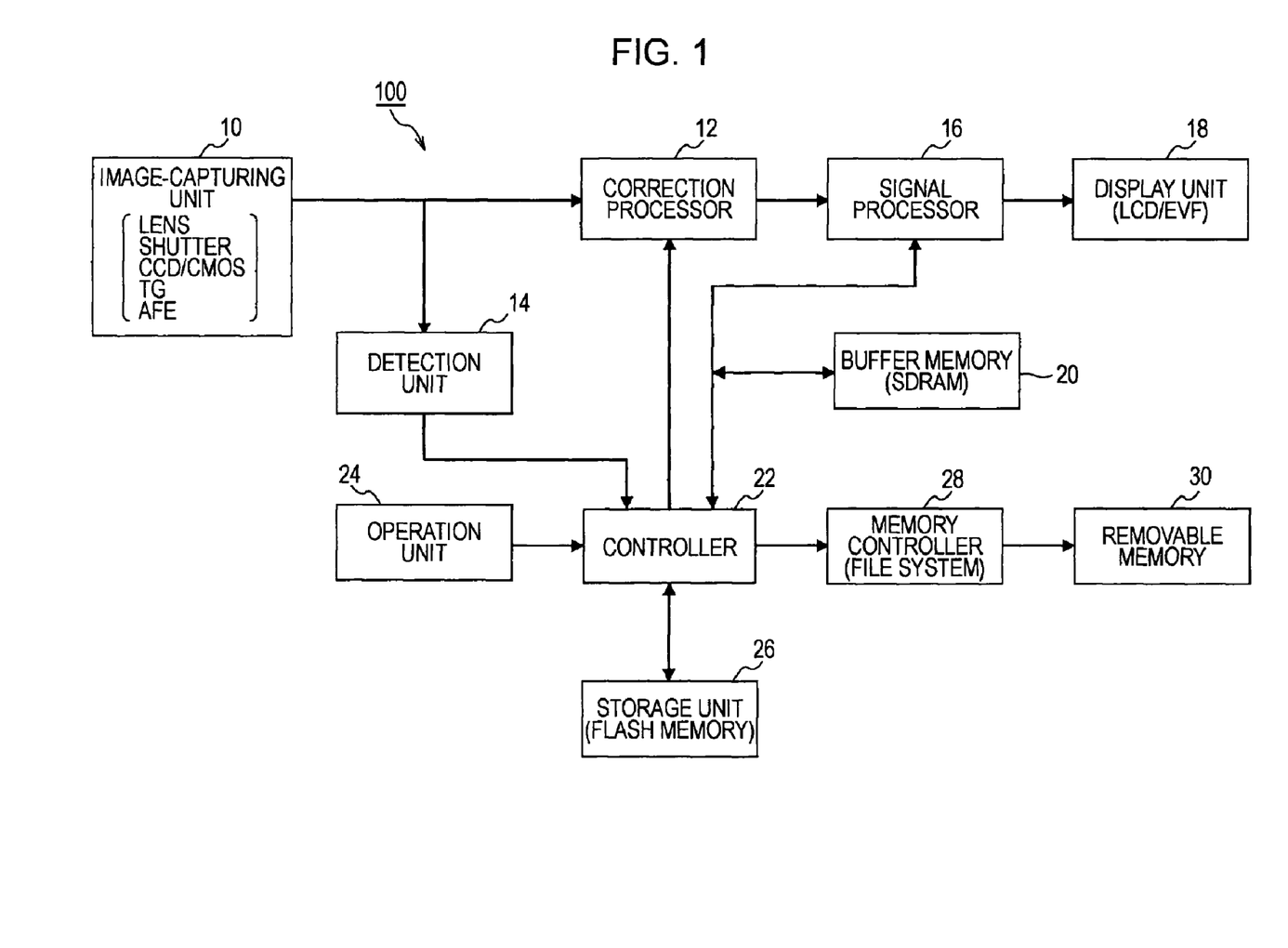
FIG. 1 is a schematic view showing the configuration of an image-capturing apparatus according to an embodiment of the present invention.

FIG. 1 is a schematic view showing the configuration of an image-capturing apparatus (digital still camera: DSC) 100 according to an embodiment of the present invention. As shown in FIG. 1, the image-capturing apparatus 100 includes an image-capturing unit 10, a correction processor 12, a detector (detection circuit) 14, a signal processor 16, a display unit 18, a buffer memory 20, a controller 22, an operation unit 24, a storage unit 26, a memory controller 28, and a removable memory 30.

The image-capturing unit 10 is configured to include an image-capturing device, such as a charge-coupled device (CCD) or a complementary metal-oxide semiconductor (CMOS), a lens optical system for forming an object body image at an image-capturing plane of the image-capturing device, a shutter, a timing generator (TG) for driving the image-capturing device, an analog front end (AFE) for performing a correlated double sampling (CDS) process and AD conversion, a lens driving circuit for driving the lens optical system, and others.

A video signal obtained by photoelectric conversion from the image-capturing device of the image-capturing unit 10 is sent to the correction processor 12, whereby, as will be described in detail later, a step difference resulting from division exposure of the image-capturing device is corrected. Furthermore, the detector 14 detects dark current in a plurality of areas of the image-capturing device for the purpose of a correction process by the correction processor 12. The video signal corrected by the correction processor 12 is sent to the signal processor 16, whereby signal processing, such as synchronization, gamma correction, matrixing, and white balance, and processing such as JPEG compression are performed. The display unit 18 is formed of a liquid-crystal display (LCD) or an electronic view finder (EVF), and displays a captured image on the basis of the video signal processed by the signal processor 16.

Furthermore, the video signal on which processing has been performed by the signal processor 16 is recorded, as an image file, in the removable memory 30 under the control of the controller 22. The memory controller 28 records the video signal in the removable memory 30 in accordance with a file system.

The operation unit 24 includes operation buttons, such as a shutter button and a zoom button. Operation information input from these buttons is sent to the controller 22.

Programs, parameters, tables, and the like necessary for signal processing in the correction processor 12, the signal processor 16, and the memory controller 28 are stored in the storage unit 26 formed of a flash memory or the like. The buffer memory 20 is a memory, such as synchronous dynamic random access memory (SDRAM) used as a data buffer, and temporarily stores video data and the like.

During image capturing, as a result of the shutter button included in the operation unit 24 being operated, operation information is input to the controller 22, and the controller 22 performs control in accordance with a program stored in advance in the storage unit 26. As a result, in the correction processor 12, a process for correcting a step difference resulting from division exposure is performed. Processing performed by the correction processor 12 will be described later. Furthermore, the corrected video signal is processed by the signal processor 16, and data of the captured image is recorded in the removable memory 30 at a format in accordance with a predetermined file system under the control of the memory controller 28. More specifically, the video signal obtained from the image-capturing unit 10 is subjected to signal processing, such as an interpolation process and pixel mixture in the signal processor 16, and is converted into, for example, an image signal of YCbCr, thereby creating an image for a recording file. For image processing in the signal processor 16, the buffer memory 20 is used as a buffer as necessary.

Regarding an image-capturing device provided in the image-capturing unit 10, a device having a large image-capturing plane in a digital single-lens reflex camera, a DSC, and the like in which importance is placed on image quality and resolving power is used. An image-capturing device according to the present embodiment is a large image-capturing device having, for example, 10 million or more pixels, and is an image-capturing device, such as a CMOS or a CCD having the same size as, for example, a 35 mm film (36×24 mm).

In a case where a large image-capturing device is to be manufactured, it is difficult to form an integrated circuit of the entire image-capturing device by one exposure process due to the relation of the specification of a semiconductor manufacturing apparatus (stepper). Therefore, as described above, the area of the image-capturing device is divided, and a manufacturing process is performed. At this time, it is difficult to collectively form a semiconductor layer, an on-chip color filter layer, an on-chip microlens layer, and the like in the entire image-capturing device. An exposure process is performed in units of divided areas, for example, in units of two or plural divided areas, thereby forming integrated circuits. By connecting these, one image-capturing device is formed.

In the image-capturing element manufactured by the divisional exposure, sensitivity difference and a difference in dark current occur for each divided area serving as a division exposure unit by the semiconductor manufacturing apparatus, and areas of different image quality occur on one image area of the captured image. In particular, regarding dark current, it is known that a slight step difference (dark current step difference) that occurs on both sides of the boundary of division exposure increases depending on image-capturing conditions, such as the exposure time period, the temperature, and the gain, thereby exerting an influence upon the image quality.

For this reason, the image-capturing apparatus 100 according to the present embodiment is designed to correct a dark current step difference (dark current difference) for each divisionally exposed area, which occurs in an image-capturing device, with a simple construction and high accuracy without exerting an influence upon the processing time period, the circuit scale, the memory capacity, and the like.

Figure 2:
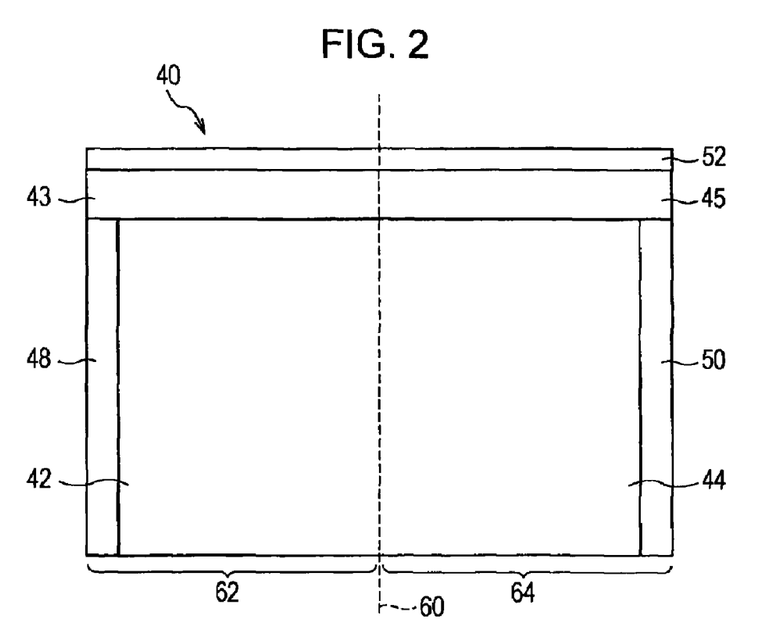
FIG. 2 is a schematic view showing the configuration of an image-capturing device.

FIG. 2 is a schematic view showing the configuration of an image-capturing device 40, and also is a plan view showing an image-capturing plane. The image-capturing plane is formed of an effective pixel part (A) 42, an effective pixel part (B) 44, a vertical OB part (A) 43, a vertical OB part (B) 45, a vertical OB part 46 (not shown) in which the vertical OB part (A) 43 and the vertical OB part (B) 45 are combined, a horizontal OB part (A) 48, a horizontal OB part (B) 50, and a dummy pixel part 52. Each of the vertical and horizontal OB parts is arranged in the periphery of the effective pixel parts 42 and 44. In FIG. 2, the vertical OB part (A) 43 and the vertical OB part (B) 45 are arranged above the effective pixel parts 42 and 44, and the horizontal OB parts 48 and 50 are arranged to the left and right of the effective pixel parts 42 and 44.

The effective pixel parts 42 and 44 are areas that receive incident light in an image-capturing process and that store a signal for forming an image. The vertical OB part (A) 43, the vertical OB part (B) 45, the horizontal OB part (A) 48, and the horizontal OB part (B) 50 are shielded from incident light, and are OB areas that are shielded from light during the image-capturing process. Pixels of the same size are arranged in an array form in all the effective pixel parts 42 and 44, the vertical OB part 46, and the horizontal OB parts 48 and 50. A captured image is generated on the basis of a video signal corresponding to the pixels contained in the effective pixel parts 42 and 44.

A dark current removal process is performed by removing dark current detected by the vertical OB part 46 from the image signal detected by the effective pixel parts 42 and 44. Here, a step difference occurs in the values of the signals output from the effective pixel parts 42 and 44 during image capturing owing to the differences in the characteristics of the effective pixel parts 42 and 44, which result from division exposure. In the present embodiment, the video signals obtained from the effective pixel parts 42 and 44 are corrected on the basis of the relation between the dark current D of the vertical OB part 46, which is obtained in advance during the manufacture of the image-capturing apparatus, and a dark current step difference d of the effective pixel parts 42 and 44.

As shown in FIG. 2, a boundary 60 formed by division exposure is formed in the center of the image-capturing plane of the image-capturing device 40. FIG. 2 shows a case in which an image-capturing device is manufactured by two division exposures (number of divisions N=2), in which one boundary 60 is formed on the image-capturing plane. The image-capturing plane is formed in such a manner that two divisionally exposed areas (image-capturing plane (A) 62, image-capturing plane (B) 64) on the right and left are joined. For this reason, with the boundary 60 acting as a boundary, dark current characteristics are different between the image-capturing plane (A) 62 and the image-capturing plane (B) 64 on the right and left, and thus a dark current step difference d occurs between the image-capturing plane (A) 62 and the image-capturing plane (B) 64.

The level of the dark current of the image-capturing device has characteristics of being proportional to the exposure time period and the gain, and exponentially increasing (increasing to approximately two times due to an increase of 10° C.) with respect to changes in temperature. The level of the dark current is represented by the following Expression (1):

$$\text{Dark} = A \cdot G \cdot t \cdot \text{EXP}\{-E \cdot q/(k \cdot T)\} \tag{1}$$

In Expression (1),
   Dark: dark current
   A: constant
   G: gain
   t: exposure time period
   E: activation energy
   q: elementary charge
   k: Boltzmann constant
   T: absolute temperature
   A2, A3, A4, and A5 denote constants of the effective pixel part (A) 42, the vertical OB parts (A) 43, the effective pixel part (B) 44, and the vertical OB part (B) 45, respectively.

E2, E3, E4, and E5 denote activation energies of the effective pixel part (A) 42, the vertical OB part (A) 43, the effective pixel part (B) 44, and vertical OB part (B) 45, respectively.

T2, T3, T4, and T5 denote absolute temperatures of the effective pixel part (A) 42, the vertical OB part (A) 43, the effective pixel part (B) 44, and the vertical OB part (B) 45, respectively.

Each value of G, t, q, and k is considered to be the same among the vertical OB part (A) 43, the vertical OB part (B) 45, the effective pixel part (A) 42, and the effective pixel part (B) 44. Therefore, if the dark current step difference d is defined as (the dark current of the effective pixel part (A) 42)−(the dark current of the effective pixel part (B) 44), d can be represented by the following Expression (2) on the basis of Expression (1).

$$d = G \cdot t \cdot [A2 \cdot \text{EXP}\{-E2 \cdot q/(k \cdot T2)\} - A4 \cdot \text{EXP}\{-E4 \cdot q/(k \cdot T4)\}] \quad (2)$$

On the basis of Expression (2), the dark current step difference d is proportional to the exposure time period t and the gain G, and has an exponential factor and a linear factor with respect to changes in temperature.

On the other hand, the dark current D3 of the vertical OB part (A) 43 and the dark current D5 of the vertical OB part (B) 45 are represented by the following Expressions (41) and (42) on the basis of Expression (1):

$$D3 = A3 \cdot G \cdot t \cdot \text{EXP}\{-E3 \cdot q/(k \cdot T3)\} \quad (41)$$

$$D5 = A5 \cdot G \cdot t \cdot \text{EXP}\{-E5 \cdot q/(k \cdot T5)\} \quad (42)$$

Here, since T2, T3, T4, and T5 are the absolute temperatures of one image-capturing device 40, the difference is slight, and therefore, it is set that T2=T3=T4=T5 (=T0). As a result, the following Expressions (45), (46), and (47) are obtained on the basis of Expressions (2), (41), and (42):

$$D = G \cdot t \cdot [A2 \cdot \text{EXP}\{-E2 \cdot q/(k \cdot T0)\} - A4 \cdot \text{EXP}\{-E4 \cdot q/(k \cdot T0)\}] \quad (45)$$

$$D3 = A3 \cdot G \cdot t \cdot \text{EXP}\{-E3 \cdot q/(k \cdot T0)\} \quad (46)$$

$$D5 = A5 \cdot G \cdot t \cdot \text{EXP}\{-E5 \cdot q/(k \cdot T0)\} \quad (47)$$

Furthermore, when the average value of the dark currents of the vertical OB part (A) 43 and the vertical OB part (B) 45 is denoted as Dvob, $$Dvob = (D3+D5)/2$$

$$Dvob = G \cdot t \cdot [A3 \cdot \text{EXP}\{-E3 \cdot q/(k \cdot T0)\} + A5 \cdot \text{EXP}\{-E5 \cdot q/(k \cdot T0)\}]/2 \quad (48)$$

As is clear from Expressions (45), (46), (47), and (48), the dark current step difference d between the effective pixel part (A) 42 and the effective pixel part (B) 44, the dark current D3 of the vertical OB part (A) 43, the dark current D5 of the vertical OB part (B) 45, and the dark current average value Dvob of the entire vertical OB part are functions of temperature T0. Therefore, the dark current step difference d can be represented as a function of the dark current D3 or D5 in the vertical OB part, or an average value Dvob thereof. Therefore, it is possible to determine the dark current step difference d between the effective pixel part (A) 42 and the effective pixel part (B) 44 on the basis of the dark current D3 of the vertical OB part (A) 43, the dark current D5 of the vertical OB part (B) 45, or the average value Dvob thereof.

In more detail, since the dark current Dx (x=3, 5, vob) is a function of temperature T0, the temperature T0 is determined by measuring Dx. On the other hand, since the dark current step difference d is a function of temperature T0, d is uniquely determined with respect to the determined temperature. That is, by erasing temperature T0 from Expression (46) (or Expression (47)) and Expression (45), the following Expression (49) is obtained:

$$d = G \cdot t \cdot [A2 \{Dx/(Ax \cdot G \cdot t)\}^{(E2/Ex)} - A4 \cdot \{Dx/(Ax \cdot G \cdot t)\}^{(E4/Ex)}] \quad (49)$$

As described above, temperature T0 can be erased from Expression (45) for determining the dark current step difference d, and can be represented as a function of Dx (x=3, 5). Therefore, it is possible to determine d on the basis of the result in which Dx is measured. Since G, t, A2, A4, E2/Ex, and E4/Ex are constants that are independent of temperature T0, if the dark current Dx is measured even if the temperature is not measured, the dark current step difference d can be determined.

Figure 4:
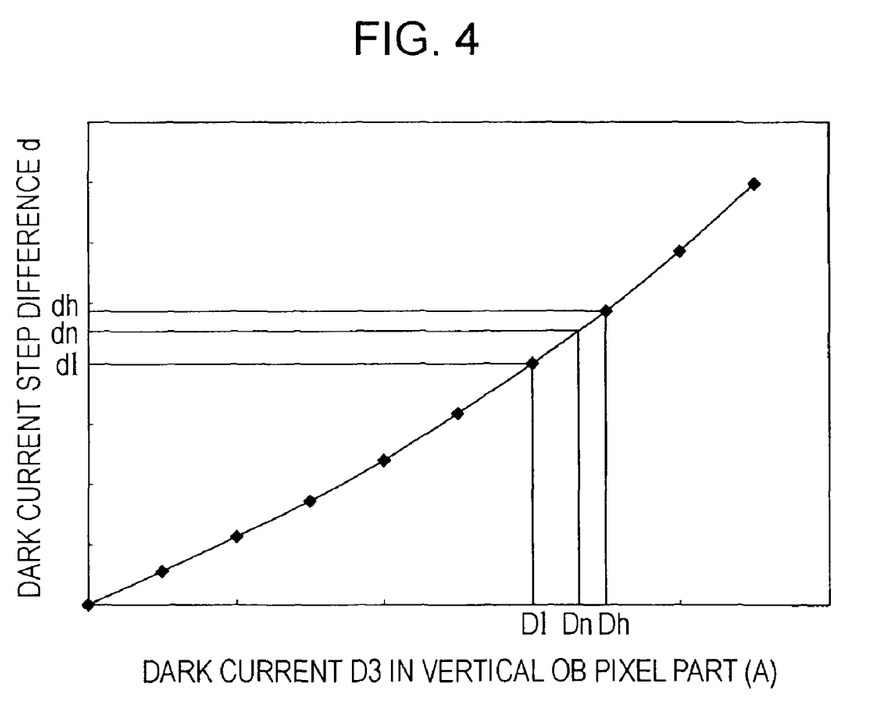
FIG. 4 is a characteristic diagram showing the relation of a dark current step difference d to dark current D3.

FIG. 4 is a characteristic diagram showing the relation of the dark current step difference d with respect to the dark current D3 of the vertical OB part (A) 43. As the horizontal axis, in place of D3, D5 or Dvob may be used. In the present embodiment, characteristics of FIG. 4 are obtained in advance during the manufacture of the image-capturing apparatus 100 and are stored in the storage unit 26.

Figure 3:
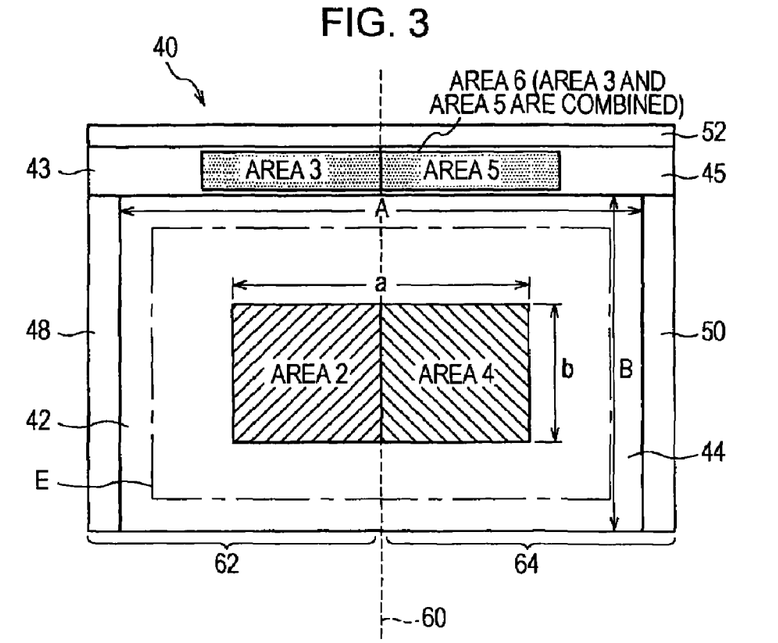
FIG. 3 is a schematic view showing a measurement area (detection frame) for which dark current is detected.

FIG. 3 is a schematic view showing a measurement area (detection frame) in which dark current is to be detected. The characteristics of FIG. 4 are obtained from the measurement area of FIG. 3. In the present embodiment, as an example, five places, that is, areas 2, 3, 4, 5, and 6 shown in FIG. 3 are set as measurement areas. In FIG. 4, a dark current is detected using the area 3, but the area 5 or 6 may also be used in place of the area 3. Here, the area 6, where the areas 3 and 5 are combined, is an area in the vicinity of the center in the right and left direction of the vertical OB part 46, and is an area that extends across the boundary 60. Furthermore, the area 2 is an area within the effective pixel part (A) 42, and the area 4 is an area within the effective pixel part (B) 44. The areas 2 and 4 are adjacent to each other and the areas 3 and 5 are adjacent to each other with the boundary 60 therebetween.

During the manufacture of the image-capturing apparatus, in the areas 2, 3, 4, 5 and 6 that are set as described above, for example, detection of an average value is performed with respect to the pixels within the areas 2, 3, 4, 5, and 6 in a state in which the image-capturing plane is shielded from light, and dark current is measured under a plurality of conditions in which the exposure time period and the temperature are different. Then, the dark current value D3 that is the detection result of the area 3, and the dark current step difference d obtained by subtracting the detection result of the area 4 from the detection result of the area 2 are determined for each of a plurality of conditions. As the characteristics of a broken line constituted by the determined plural points, the characteristics of FIG. 4 are obtained and stored in the storage unit 26. In the manner described above, as the horizontal axis of FIG. 4, D5 or Dvob may be used in place of D3.

During capturing of images, the dark current D3 of the vertical OB part (A) 43 is measured for each image capturing, and a dark current step difference d is determined on the basis of the characteristics of FIG. 4. At this time, the dark current D3 of the vertical OB part (A) 43 is detected by the detector 12 and is sent to the controller 22. The controller 22 calculates the step difference d on the basis of the dark current D3 by using the characteristics of FIG. 4, which are stored in the storage unit 26. On the basis of the step difference d calculated by the controller 22, the correction processor 12 offsets (adds) the step difference by an amount corresponding to the step difference d with respect to the video signal obtained by the effective pixel part (B) 44.

As described above, in the characteristics of FIG. 4, the vertical axis shows the dark current step difference d obtained by subtracting the detection result of the area 4 from the detection result of the area 2. Therefore, by adding, to the video signal of the effective pixel part (B) 44, the step difference d obtained from the characteristics of FIG. 4 during image capturing, the dark current step difference between the effective pixel part (A) 42 and the effective pixel part (B) 44 becomes zero, thereby making it possible to correct the video signal. As a result, the difference in the characteristics between the effective pixel part (A) 42 and the effective pixel part (B) 44, which results from division exposure, can be corrected with high accuracy.

The characteristics of FIG. 4 are obtained in advance under a plurality of different conditions in which the exposure time period and the temperature are different. Consequently, during correction, it is possible to correct the step difference on the basis of only the dark current D3 detected in the area 3 without considering the exposure time period and the temperature. Therefore, it is not necessary to detect the exposure time period and the temperature for the purpose of correction, and the correction can be performed in real time and with high accuracy by using only the output of the image-capturing device. As a result, it is not necessary to increase the circuit scale, the memory capacity, the processing time period, and the like for the purpose of correction. Furthermore, it is not necessary to provide a temperature sensor and the like for the purpose of correction, making it possible to simplify the configuration.

As shown in FIG. 4, in a case where the relation between the dark current D3 and the dark current step difference d is obtained at a plurality of points, a step difference dn to be determined during image capturing can be calculated by interpolation, and interpolation calculations can be realized by, for example, linear interpolation, a least square method, or the like. For example, in a case where linear interpolation is to be performed from two pointes (Dl, dl) and (Dh, dh), which are obtained in advance by detection during manufacture, it is possible to determine the step difference dn on the basis of the dark current Dn detected in the area 3 in accordance with the following Expression (5):

$$dn = dl + (Dn - Dl) \cdot (dh - dl)/(Dh - Dl) \quad (5)$$

In Expression (45), in a case where the difference in the activation energies is small in the vicinity of the boundary 60 and E2=E4 (=E0) holds, the following Expression (6) holds:

$$d = G \cdot r \cdot (A2 - A4) \cdot \text{EXP}\{-E0 \cdot q/(k \cdot T0)\} \quad (6)$$

Then, if it is assumed that the temperature and the activation energy are equal between the vertical OB part 43 in which the area 3 is provided and each of the effective pixel parts 42 and 44 in which the areas 2 and 4 are provided, respectively, the following Expression (7) is obtained on the basis of Expressions (45) and (46):

$$d/D3 = (A2 - A4)/A3 \quad (7)$$

As described above, the dark current step difference d and the dark current D3 output from the vertical OB part (A) 43 can be considered to be in a proportional relationship. In this case, the characteristics of FIG. 4 are linear. Thus, by measuring the dark current value D and the dark current step difference d at only one point during the manufacture of the image-capturing apparatus, it is possible to determine the ratio of the dark current step difference d to the dark current D. For example, by performing exposure for approximately 60 seconds at a temperature of 40° C., it is possible to generate a sufficiently large dark current. This one condition enables the ratio of the dark current step difference d to the dark current D3 to be determined. Therefore, only the ratio coefficient of the dark current step difference d to the dark current D3 should be stored in the storage unit 26, and it is not necessary to store the characteristics of FIG. 4, thereby making it possible to reduce the capacity of the storage unit 26. Furthermore, since an interpolation process like Expression (5) is unnecessary, the time period for interpolation calculations can be shortened, and the processing load can be reduced.

As shown in FIG. 3, the area 6 is arranged in such a manner as to extend across the boundary 60 in the area of the vertical OB part 46. As a result of arranging the area 6 in this manner, it is possible to average the step differences of the dark currents of the vertical OB part 46 with the boundary 60 acting as a boundary, and it is possible to determine, with high accuracy, the dark current step difference d between the effective pixel part (A) 42 and the effective pixel part (B) 44.

As shown in FIG. 3, the area 2 and the area 4 are arranged in the center of the effective pixel parts 42 and 44, and the length a in the horizontal direction (in the right and left direction) of the area in which the area 2 and the area 4 are combined is set to approximately ½ of the long side A in the horizontal direction of the effective pixel parts 42 and 44. The length b of the area 2 and the area 4 in the vertical direction (in the up-and-down direction) is also set to approximately ½ of the short side B of the effective pixel parts 42 and 44 in the vertical direction.

Since peripheral circuits, such as a counter, an AD converter, and the like, are arranged in the region surrounding the effective pixel parts 42 and 44, in the outer edge of the effective pixel parts 42 and 44, the temperature increases due to the peripheral circuits. For this reason, if the area 2 and the area 4 are extended to the outer edge of the effective pixel parts 42 and 44, an increase in temperature due to the peripheral circuits acts as an error factor, and it is difficult to accurately determine the characteristics of FIG. 4. In the periphery of the effective pixel parts 42 and 44, an increase in the temperature of the peripheral circuits suddenly occurs in an area (in FIG. 3, an area outside a frame E indicated using a short dashed line) corresponding to approximately 10% of the long side A and the short side B. For this reason, by setting the length a of the area in which the area 2 and the area 4 are combined in the horizontal direction to ½ or lower of the long side A of the effective pixel parts 42 and 44 in the horizontal direction and by setting the length b in the vertical direction to ½ or lower of the short side B of the effective pixel parts 42 and 44 in the vertical direction, an influence of an increase in temperature due to the peripheral circuits can be reliably avoided.

In the above-described configuration, the step difference d is determined on the basis of the dark current D3 detected in the area 3 of the vertical OB part (B) 43. In addition, by using the identical technique, the step difference d may be determined on the basis of the dark current D5 detected in the area 5 by the vertical OB part (B) 45 or on the basis of the dark current Dvob (the average value of D3 and D5) detected in the area 6 in which the areas 3 and 5 are combined, the area 6 extending across the boundary 60. Furthermore, the step difference d can also be determined on the basis of the dark current detected from one or both of the horizontal OB parts 48 and 50. In this case, correction is possible by using the identical technique by obtaining the relationship between the dark currents of the horizontal OB parts 48 and 50 and the step difference d in advance during the manufacture of the image-capturing apparatus 100.

Next, a description will be given of processing performed by the image-capturing apparatus 100 according to the present embodiment. During image capturing, the dark current of the area 3 is detected by the detector 14 of the image-capturing apparatus 100. The dark current of the area 3 is sent to the controller 22. In the controller 22, the dark current step difference d is determined by referring to the characteristics of FIG. 4, which are stored in the storage unit 26. The controller 22 sends the dark current step difference d to the correction processor 12.

Figure 5:
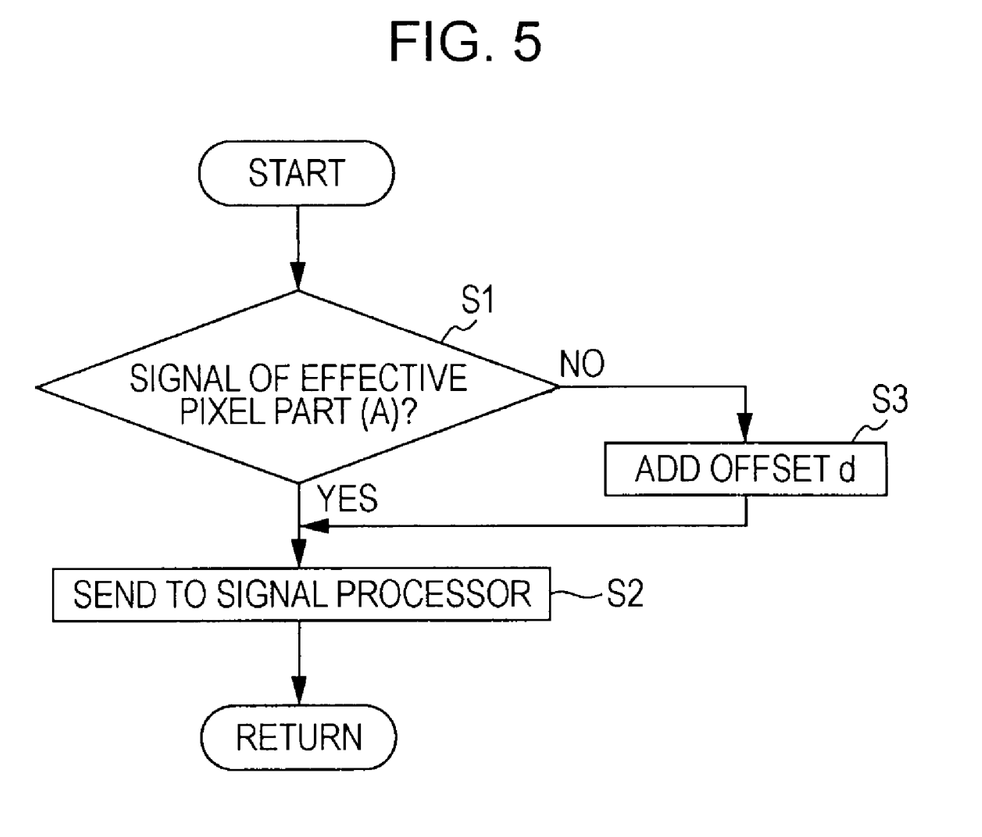
FIG. 5 is a flowchart showing processing in a correction processor of the image-capturing apparatus.

FIG. 5 is a flowchart showing processing in the correction processor 12. The correction processor 12 adds the dark current step difference (offset) d to the entire video signal with respect to only the effective pixel part (B). First, in step S1, it is determined whether or not the video signal is a signal from the effective pixel part (A) 42. When the video signal is a signal from the effective pixel part (A) 42, the process proceeds to step S2. In step S2, the video signal is sent to the signal processing circuit 16 at a subsequent stage without adding the offset d to the video signal.

On the other hand, when it is determined in step S1 that the video signal is not a signal from the effective pixel part (A) 42, the video signal is a signal from the effective pixel part (B) 44. Therefore, in step S3, the offset d is added to the video signal. Then, in step S2, the signal in which the offset d has been added is sent to the signal processor 16 at a subsequent stage. After step S2, the processing is completed (RETURN).

According to the processing of FIG. 5, the step difference d is added to the video signal of only one of the effective pixel part (A) 42 and the effective pixel part (B) 44 having the step difference d before correction, making it possible to remove the step difference.

The above-described processing can be implemented by circuits (hardware) forming the blocks of FIG. 1, or by a central processing unit (CPU) and software (program) for causing the central processing unit (CPU) to function. When the above-described processing is to be implemented by the central processing unit and the software, it is possible to allow the controller 22 to function as the central processing unit, and software can be stored in the storage unit 26.

In the above-described description, a case in which the image-capturing plane of the image-capturing device 40 is divided into two portions on the right and left and division exposure is performed has been used as an example. Alternatively, in a case where all the pixels are divided into N portions and division exposure is performed, N−1 boundaries occur. Therefore, by storing N−1 correction tables shown in FIG. 4, advantages similar to those in the case of N=1 are obtained. Therefore, according to the present embodiment, in a case where the image-capturing device 40 is formed by division exposure, it is possible to correct with high accuracy a slight dark current step difference d that occurs on both sides of the joint of the boundary 60 regardless of the number of divisions.

As has been described in the foregoing, according to the present embodiment, in a large image-capturing device that is manufactured by division exposure, it is possible to accurately correct and remove a step difference d of a dark current, which occurs in the boundary 60 of division exposure, without increasing the circuit scale, the memory capacity, the processing time period, and the like. As a result, it is possible to reliably reduce a decrease in image quality and differences of image quality, which occur with the boundary 60 acting as a boundary. Furthermore, even when the number of divisions N of division exposure is large, correction is possible. Therefore, also, in an optical system in which, for example, the size of the image-capturing plane is further larger than that of a digital single-lens reflex camera of 35 mm full size, a decrease in image quality, which results from division exposure, can be suppressed.

The present application contains subject matter related to that disclosed in Japanese Priority Patent Application JP 2008-136915 filed in the Japan Patent Office on May 26, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents hereof.

What is claimed is:

1. An image-capturing apparatus comprising:
   an image-capturing device having an effective pixel area formed of a plurality of areas having different dark current characteristics and a light-shielded pixel area arranged in a region surrounding the effective pixel area;
   a storage unit configured to prestore a correlation between a dark current difference between each pair of adjacent areas and dark current of the light-shielded pixel area;
   a detector configured to detect the dark current of the light-shielded pixel area during image capturing;
   a dark current difference obtaining unit configured to obtain, from the dark current of the light-shielded pixel area detected during the image capturing, dark current differences between each pair of adjacent areas during image capturing on the basis of the correlation stored in the storage unit; and
   a correction processor configured to correct a video signal obtained from the effective pixel area on the basis of the obtained dark current differences between each pair of adjacent areas during the image capturing.

2. The image-capturing apparatus according to claim 1, wherein the storage unit stores, as the correlation, a table in which dark current difference between each pair of adjacent areas and the dark current of the light-shielded pixel area are associated with one another so as to be obtained under a plurality of different conditions.

3. The image-capturing apparatus according to claim 1, wherein the storage unit stores, as the correlation, ratios of the dark current difference between each pair of adjacent areas to the dark current of the light-shielded pixel area.

4. The image-capturing apparatus according to claim 1, wherein the plurality of areas having different dark current characteristics are separated by a boundary line, and the dark current of the light-shielded pixel area is obtained within the light-shielded pixel area.

5. The image-capturing apparatus according to claim 1, wherein all areas of the plurality of areas have equal dimensions and the light-shielded pixel area is arranged in a region surrounding only one of the plurality of areas of the effective pixel area.

6. An image-capturing method comprising:
   prestoring a correlation between a dark current difference between each pair of adjacent areas and dark current of a light-shielded pixel area in an image-capturing device having an effective pixel area formed of the plurality of areas having different dark current characteristics and a light-shielded pixel area arranged in a region surrounding the effective pixel area;
   detecting the dark current of the light-shielded pixel area during image capturing;
   obtaining, from the dark current of the light-shielded pixel area detected during the image capturing, dark current differences between each pair of adjacent areas during image capturing on the basis of the correlation; and correcting a video signal obtained from the effective pixel area on the basis of the obtained dark current differences between each pair of adjacent areas during the image capturing.

7. The image-capturing method according to claim 6, wherein all areas of the plurality of areas have equal dimensions and the light-shielded pixel area is arranged in a region surrounding only one of the plurality of areas of the effective pixel area.

8. A non-transitory computer-readable storage medium storing instructions thereon, which, when executed by a computer, cause the computer to function as:

means for detecting dark current of a light-shielded pixel area of an image-capturing device during image capturing;

means for obtaining, from the dark current of the light-shielded pixel area detected during the image capturing, dark current differences between each pair of adjacent areas forming an effective pixel area during image capturing on the basis of a pre-obtained correlation between a dark current difference between each pair of adjacent areas in the effective pixel area and dark current of the light-shielded pixel area; and means for correcting a video signal obtained from the effective pixel area on the basis of the obtained dark current differences between each pair of adjacent areas during the image capturing.

* * * * *